US011190862B1

United States Patent
Jorgenson et al.

(10) Patent No.: US 11,190,862 B1
(45) Date of Patent: Nov. 30, 2021

(54) ENHANCED HIGH FREQUENCY AVALANCHE RELAY PROTOCOL

(71) Applicant: Rockwell Collins, Inc., Cedar Rapids, IA (US)

(72) Inventors: Mark B. Jorgenson, Kanata (CA); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/098,954

(22) Filed: Nov. 16, 2020

(51) Int. Cl.
*H04L 12/26* (2006.01)
*H04Q 11/04* (2006.01)
*H04L 12/54* (2013.01)
*H04L 12/70* (2013.01)

(52) U.S. Cl.
CPC ..... *H04Q 11/0478* (2013.01); *H04L 12/5601* (2013.01); *H04Q 11/0457* (2013.01); *H04L 2012/5671* (2013.01)

(58) Field of Classification Search
None
See application file for complete search history.

(56) References Cited

U.S. PATENT DOCUMENTS

| | | | |
|---|---|---|---|
| 4,639,937 A | 1/1987 | McRae et al. | |
| 5,506,848 A * | 4/1996 | Drakopoulos | H04W 72/0446 370/336 |
| 5,515,379 A * | 5/1996 | Crisler | H04J 3/1694 370/347 |
| 5,521,925 A | 5/1996 | Merakos et al. | |
| 5,703,881 A | 12/1997 | Kay et al. | |
| 6,172,971 B1 | 1/2001 | Kim | |
| 6,411,613 B1 | 6/2002 | Seymour et al. | |
| 6,456,633 B1 * | 9/2002 | Chen | H04J 4/00 370/352 |
| 6,847,821 B1 * | 1/2005 | Lewis | H04J 3/1605 370/337 |
| 8,289,933 B2 | 10/2012 | Das et al. | |
| 9,253,773 B2 * | 2/2016 | Khoo | H04B 7/2656 |
| 9,456,434 B1 | 9/2016 | Gossett et al. | |
| 2002/0126689 A1 * | 9/2002 | Redington | H04J 3/1682 370/442 |
| 2008/0080547 A1 | 4/2008 | Feiertag et al. | |
| 2019/0342888 A1 | 11/2019 | Hosseini et al. | |

\* cited by examiner

*Primary Examiner* — Phuongchau Ba Nguyen
(74) *Attorney, Agent, or Firm* — Suiter Swantz pc llo

(57) ABSTRACT

A system and method for time division multiplexing voice and situational awareness data with defined transmission and retransmission windows comprises coordinating the voice and situational awareness windows at defined times across all nodes. Control signal windows and control signal retransmission windows are also defined to propagate control signals to coordinate the various voice and situational awareness windows. Voice data is prioritized for bandwidth.

20 Claims, 4 Drawing Sheets

ENHANCED HIGH FREQUENCY AVALANCHE RELAY PROTOCOL

BACKGROUND

Supporting voice and data simultaneously is particularly challenging in HF where overhead is significant and data rates are such that supporting digital voice alone is non-trivial. When operating in a near vertical incidence skywave (NVIS) mode, the RF energy is refracted down to a circular area with a radius of up to 400 miles from the transmitter. However, due to independent fading and impairments on the different transmitter-to-receiver paths, it is likely that not all receivers in a network within that footprint will receive the transmission error free. Similar issues can arise with line of sight transmission between multiple nodes in a smaller area using HF surface wave propagation. The simplest example involves interleaving voice and data which produces long latencies for voice users that may result in on-air voice collisions.

It would be advantageous to have a system and method to support low latency voice and situational awareness services where all nodes that hear a transmission make a coordinated retransmission of the same information in a later, synchronized transmission.

SUMMARY

In one aspect, embodiments of the inventive concepts disclosed herein are directed to a system and method for time division multiplexing voice and situational awareness data with defined transmission and retransmission windows.

In a further aspect, control signal windows and control signal retransmission windows are also defined to propagate control signals to coordinate the various voice and situational awareness windows.

In a further aspect, voice transmission and retransmission windows are reallocated to situational awareness data when no voice data is forthcoming, and voice data is given bandwidth priority.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
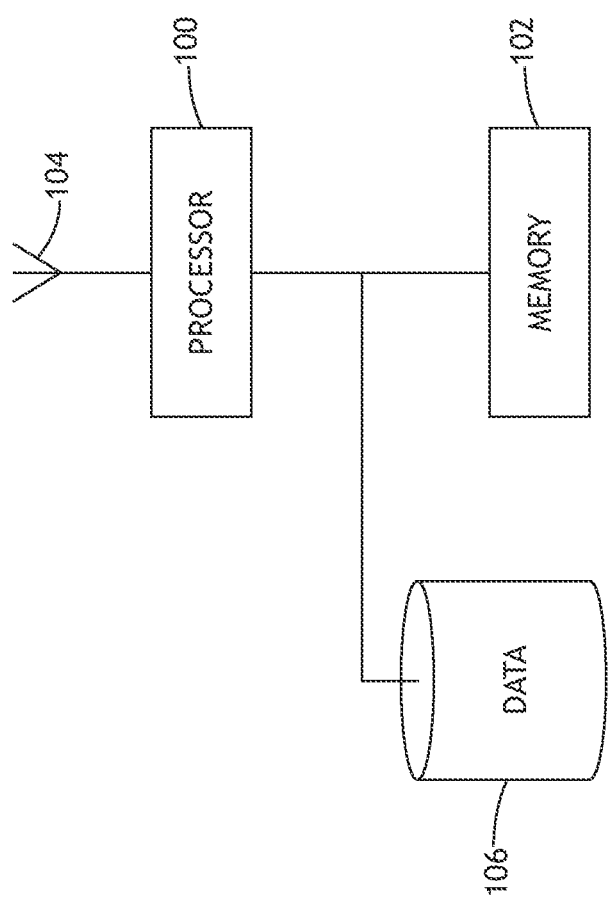
FIG. 1 shows a block diagram of a system suitable for implementing exemplary embodiments of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for time division multiplexing voice and situational awareness data with defined transmission and retransmission windows. Retransmissions are synchronized such that the retransmissions appear to be aligned at the receiver and can be treated as artificial multipath receptions. Retransmission functionality may be more fully understood with reference to U.S. patent application Ser. No. 16/810,542 (filed Mar. 5, 2020) which is hereby incorporated by reference. Control signal windows and control signal retransmission windows are also defined to propagate control signals to coordinate the various voice and situational awareness windows. Voice transmission and retransmission windows may be reallocated to situational awareness data when no voice data is forthcoming, and voice data is given bandwidth priority.

Referring to FIG. 1, a block diagram of a system suitable for implementing exemplary embodiments of the inventive concepts disclosed herein is shown. The system includes a processor 100, a memory 102 connected to the processor 100 for embodying processor executable code, an antenna 104 connected to the processor 100 configured for HF communication, and a data storage element 106 connected to the processor 100 for allowing the processor 100 to receive and store data packets for retransmission during a relay window as described herein. When operating in an HF range (such as during NVIS operation or surface naval operations), bandwidth may be restricted such that reliable voice transmission and relay cannot operate alongside reliable situational awareness transmission and relay. The processor 100 is configured to define a primary voice window wherein only a primary voice data source (a single node for the duration of a voice data transmission) transmits voice data packets, and a voice relay window wherein nodes in a self-organizing network will retransmit the voice data packets if previously received and attempt to receive voice data packets if not. Furthermore, the processor 100 is configured to define a situational awareness window wherein the node sends and receives situational awareness data, and a situational awareness relay window wherein nodes in the self-organizing network will retransmit any received situational awareness data. It may be appreciated that "situational awareness" more generically, is non-voice data traffic.

In at least one embodiment, while retransmissions by all retransmitting nodes must be identical for a given retransmission window, it does not necessarily have to be identical to the original transmission. This can be exploited by including additional forward error correction bits during the retransmission, allowing a node that receives transmissions in the original and retransmission windows to take advantage of a lower rate code than would be possible if the same information were transmitted in both. In one exemplary embodiment, a node may detect the original transmission, validate it, then create the appropriate retransmission from the detected data. Detection and validation must occur before retransmitting or risk creating interference by retransmitting erroneous data.

In at least one embodiment, the system may prioritize reliability over voice quality and therefore may operate with a lower rate vocoder, for example a 1200 bps vocoder rather than a 2400 bps vocoder. It may be appreciated that if the situational awareness window and situational awareness relay window are each half the duration of the primary voice window, the primary voice window comprises ⅓ of the frame. In order to support a 2400 bps vocoder, the voice data source would have to run at three times that rate or 7200 bps for very long windows. For short windows, needed to support low latency voice, rates have to increase further, necessitating high signal-to-noise ratios for successful reception. Use of a 1200 bps vocoder, instead of a 2400 bps vocoder, improves this substantially, cutting the required burst data rates in half to levels where the signaling can be met with 8PSK modulation and high rate coding in a 3 kHz channel. Bit rate selection may be different where wider bandwidth channels are available.

In at least one embodiment, voice users directly manage channel access and collision avoidance for voice; they listen and use standard radio procedures to minimize the likelihood of users transmitting over top of each other. The difficulty associated with avoiding voice collisions increases as the latency associated with voice transmissions increases. Making slots very small reduces latency, but increases the proportion of overhead associated with each slot. As a result, to maintain data rates sufficient to support digital vocoders, reducing slot sizes results in a requirement to increase modulation order (bits per symbol), reduce forward error correction coding, or otherwise reduce the robustness of the signal. The receiver may not begin outputting voice until after the receipt of the entire voice relay window. Effective latency is then from whenever the transmitting user presses push-to-talk (PTT) until after the voice relay window. In the worst case, the voice activates PTT just after a primary voice window and has to wait through an entire frame until the next primary voice window. As audio signals don't come out at the receiver until after the voice relay window, the latency is close to two full frames. It may be appreciated that data streams are divided into frames, which are then divided into time slots as described herein.

In at least one embodiment, the processor 100 defines control signal windows and control signal relay windows to send and receive original control signals and retransmit received control signals. The control signals synchronize various temporal windows in the time-division multiplexed signal so that all of the nodes in the self-organizing network operate in an appropriate phase. Furthermore, control signals may be used to indicate when a voice data packet may be expected. The control signals utilize the same relay architecture and are very short due to the limited amount of control information being conveyed. Minimizing the length of control signals is important and may preferentially use a robust low rate waveform, such as a Walsh encoded burst waveform. Control signals may include instructions to change signaling rates.

In at least one embodiment, the primary voice window and voice relay window may be reallocated to situational awareness data whenever no voice data packets are expected. In at least one embodiment, control signal windows may be relatively fixed in the frame while situational awareness windows and voice windows may be dynamically allocated via the control signals. Furthermore, control signals may allocate situational awareness windows to particular sets of nodes to suppress cross-talk.

Figure 2:
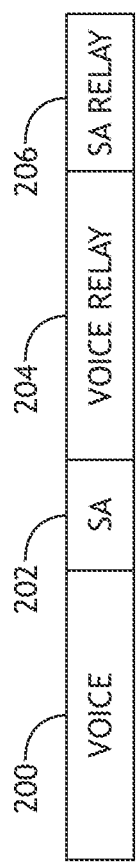
FIG. 2 shows a block diagram of a time division structure according to an exemplary embodiment.

Referring to FIG. 2, a block diagram of a time division structure according to an exemplary embodiment is shown. The time-division multiplexed signal is temporally divided into a primary voice window 200 when nodes in a self-organizing network send or receive new voice data packets, and a situational awareness window 202 when nodes send and receive situational awareness data from other nodes. The signal is also divided into a voice relay window 204 when nodes retransmit voice data packets if any where received, or receive retransmitted voice data packets if not. The signal is also divided into a situational awareness relay window 206 when nodes retransmit received situational awareness data and receive retransmitted situational awareness data.

Windows 200, 202, 204, 206 may be predefined based on some common organizing principle of all nodes in the network. For example, when a node joins the network, it may receive the time-division multiplexed structure for the network according to a common clock signal. It may be appreciated that multiple relay windows 204, 206 may be employed in each frame.

Figure 3:
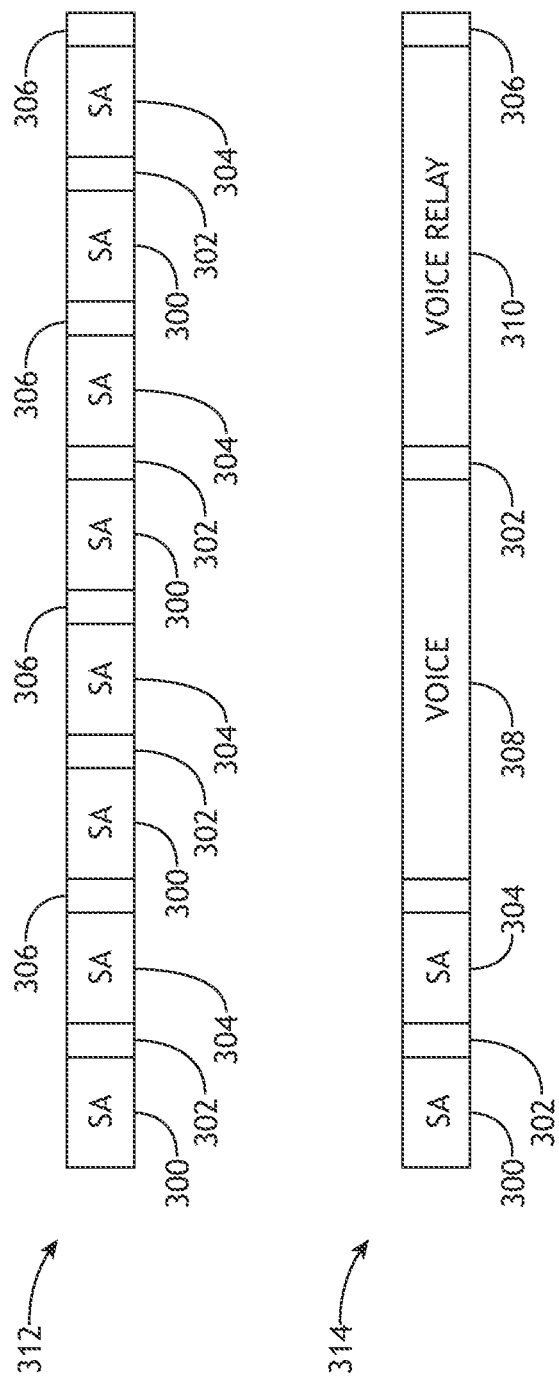
FIG. 3 shows block diagrams of time division structures according to exemplary embodiments.

Referring to FIG. 3, block diagrams of time division structures 312, 314 according to exemplary embodiments are shown. In a first time division structure 312, a signal is divided into situational awareness windows 300 when new situational awareness data is transmitted and received, and situational awareness relay windows 304 when received situational awareness data is retransmitted and received. Furthermore, control signal windows 302 and control signal retransmission windows 306 are interposed and interleaved between the situational awareness windows 300 and situational awareness relay windows 304. During the control signal windows 302 and control signal retransmission windows 306 control signals are sent, received and retransmitted to every node in a self-organizing network. Control signals may include synchronization information to define the various windows 300, 302, 304, 306 in time. Furthermore, the control signals may include an indication that one of the nodes intends to transmit voice data packets.

In at least one embodiment, a second time division structure 314, the signal is divided into situational awareness windows 300 and situational awareness relay windows 304, and primary voice windows 308 and voice relay windows 310. During primary voice windows 308, a voice data source node transmits voice data packets; during voice relay windows 310, all nodes that have received the voice data packets, including the primary node, retransmit the voice data packets for any nodes that did not receive the voice data packets during the primary voice window 308.

Control signals sent, received, and retransmitted during the control signal windows 302 and control signal retransmission windows 306 may include an indication of voice data source node so that other nodes will refrain from transmitting during the primary voice window 308. Voice data packets are generally more bandwidth intensive than situational awareness data, especially in the HF band; therefore, it is important to prevent interference during primary voice windows 308 and voice relay windows 310.

Control signals may instruct the nodes in the network to add primary voice windows 308 and voice relay windows 310 dynamically when one of the nodes indicates an intent to transmit voice data packets.

In at least one embodiment, situational awareness and voice windows 300, 304, 308, 310 are organized with situational awareness windows 300, 304 being proximal to each other and voice windows 308, 310 being proximal to each other. That is to say, the order of time divisions places the situational awareness window 300, then situational awareness relay window 304, then primary voice window 308, then voice relay window 310 with control signal windows 302, 306 interwoven. Space may be reserved between each of the situational awareness and voice windows 300, 304, 308, 310 for control signal windows 302, 304.

Figure 4:
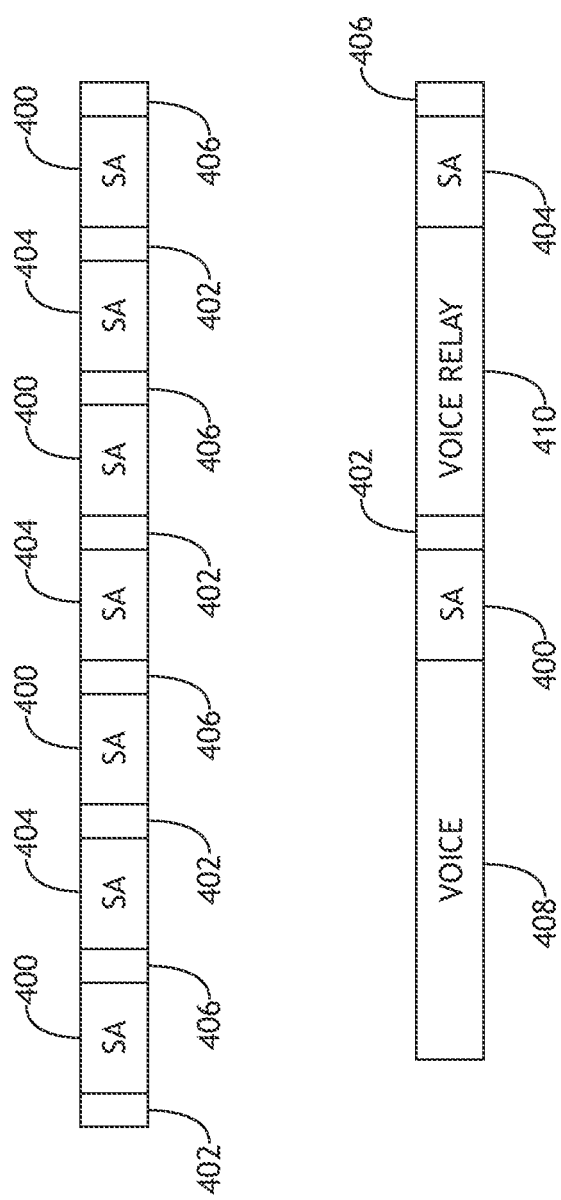
FIG. 4 shows block diagrams of time division structures according to exemplary embodiments.

Referring to FIG. 4, block diagrams of time division structures 412, 414 according to exemplary embodiments are shown. In a first time division structure 412, a signal is divided into situational awareness windows 400 and situational awareness relay windows 404. Control signal windows 402 and control signal retransmission windows 406 are interposed and interleaved between the situational awareness windows 400 and situational awareness relay windows 404.

When an indication that a voice data packets are incoming, a second time division structure 414 may be implemented wherein the signal is divided into situational awareness windows 400 and situational awareness relay windows 404, and primary voice windows 408 and voice relay windows 410. During primary voice windows 408, a voice data source node transmits voice data packets; during voice relay windows 410, all nodes that have received the voice data packets, including the primary node, retransmit the voice data packets for any nodes that did not receive the voice data packets during the primary voice window 408.

Control signals may instruct the nodes in the network to add primary voice windows 408 and voice relay windows 410 dynamically when one of the nodes indicates an intent to transmit voice data packets. In at least one embodiment, situational awareness and voice windows 400, 404, 408, 410 are interleaved with primary transmission windows (a primary voice window 408 and situational awareness window 400) followed by retransmission windows (a voice relay window 410 and situational awareness relay window 404). Space may be reserved between the blocks of primary transmission windows 408, 400 and retransmission windows 410, 404 for control signal windows 402, 406.

In at least one embodiment, multiple networks may be stacked and operate at different frequencies, so that the retransmission windows 410, 404 are coordinated so that they don't overlap. A node that was interested in monitoring those channels (not participating actively in relays) could maximize the utility of its monitoring by looking only at a final retransmission window 410, 404 in each channel. This may allow a node with a single channel receiver to actively monitor 2 or 3 channels with little to no loss in information. Alternatively, or in addition, nodes could operate in a stacked network where a node could transmit and receive during situational awareness windows 400, 404 in one stacked network while transmitting and receiving during voice windows 408, 410 in a different stacked network.

Originating transmissions may be sent at lower data rates (longer windows) to increase the likelihood of being received and relayed. Retransmission windows of voice and data could be combined into a single relay transmission, thereby reducing the number of transmissions with individual per transmission overhead. Multiple situational awareness windows could be aggregated into a single relay transmission by nodes that received all windows being aggregated.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:
1. A method comprising:
defining a primary voice window in a time division multiplexed signal;
defining a situational awareness window in the time division multiplexed signal;
defining a voice relay window in the time division multiplexed signal;
defining a situational awareness relay window in the time division multiplexed signal;
receiving a voice data packet during the primary voice window;
receiving a situational awareness data packet during the situational awareness window;

retransmitting the voice data packet to other network nodes in a plurality of network nodes during the voice relay window; and retransmitting the situational awareness data packet to other network nodes in the plurality of network nodes during the situational awareness relay window.

2. The method of claim 1, further comprising receiving a synchronization signal common to every network node in the plurality of network nodes, wherein the primary voice window, situational awareness window, voice relay window, and situational awareness relay window are defined with respect to the synchronization signal.

3. The method of claim 1, further comprising:

defining one or more control signal windows in the time division multiplexed signal; and defining one or more control signal relay windows in the time division multiplexed signal.

4. The method of claim 3, further comprising:

receiving a control data packet indicating a primary voice node that will be sending a voice data packet in the primary voice window; and retransmitting the control data packet to other network nodes in the plurality of network nodes during the control signal relay window.

5. The method of claim 4, wherein the control data packet includes a bit rate and vocoder instruction.

6. The method of claim 4, wherein the control data packet includes a schedule of assignments for situational awareness windows to subsets of nodes in the plurality of nodes.

7. The method of claim 3, further comprising:

sending a signal to other network nodes in the plurality of network nodes that the processor will be a primary voice data source during a subsequent primary voice window during the control signal window; and sending a voice data packet during the subsequent primary voice window.

8. The method of claim 1, further comprising:

determining that there is no primary voice data source; and reallocating the primary voice window and voice relay window for situation awareness transmission and retransmission.

9. A system comprising:

a plurality of network nodes, each network node comprising:

a high frequency (HF) antenna; and at least one processor in data communication with the HF antenna and a memory storing processor executable code for configuring the at least one processor to:

define a primary voice window in a time division multiplexed signal;

define a situational awareness window in the time division multiplexed signal;

define a voice relay window in the time division multiplexed signal;

define a situational awareness relay window in the time division multiplexed signal;

receive a voice data packet during the primary voice window;

receive a situational awareness data packet during the situational awareness window;

retransmit the voice data packet to other network nodes in the plurality of network nodes during the voice relay window; and retransmit the situational awareness data packet to other network nodes in the plurality of network nodes during the situational awareness relay window.

10. The system of claim 9, wherein the at least one processor is further configured to receive a synchronization signal common to every network node in the plurality of network nodes, wherein the primary voice window, situational awareness window, voice relay window, and situational awareness relay window are defined with respect to the synchronization signal.

11. The system of claim 9, wherein the at least one processor is further configured to:

define one or more control signal windows in the time division multiplexed signal; and define one or more control signal relay windows in the time division multiplexed signal.

12. The system of claim 11, wherein the at least one processor is further configured to:

receive a control data packet indicating a primary voice node that will be sending a voice data packet in the primary voice window; and retransmit the control data packet to other network nodes in the plurality of network nodes during the control signal relay window.

13. The system of claim 12, wherein the control data packet includes a bit rate and vocoder instruction.

14. The system of claim 11, wherein the at least one processor is further configured to:

send a signal to other network nodes in the plurality of network nodes that the processor will be a primary voice data source during a subsequent primary voice window during the control signal window; and send a voice data packet during the subsequent primary voice window.

15. A computer apparatus comprising:

at least one processor in data communication with a memory storing processor executable code for configuring the at least one processor to:

define a primary voice window in a time division multiplexed signal;

define a situational awareness window in the time division multiplexed signal;

define a voice relay window in the time division multiplexed signal;

define a situational awareness relay window in the time division multiplexed signal;

receive a voice data packet during the primary voice window;

receive a situational awareness data packet during the situational awareness window;

retransmit the voice data packet to one or more nodes in a network of nodes during the voice relay window; and retransmit the situational awareness data packet to at least one node in the network of nodes during the situational awareness relay window.

16. The computer apparatus of claim 15, wherein the at least one processor is further configured to receive a synchronization signal common to every node in the network of nodes, wherein the primary voice window, situational awareness window, voice relay window, and situational awareness relay window are defined with respect to the synchronization signal.

17. The computer apparatus of claim 15, wherein the at least one processor is further configured to:
- define one or more control signal windows in the time division multiplexed signal; and
- define one or more control signal relay windows in the time division multiplexed signal.

18. The computer apparatus of claim 17, wherein the at least one processor is further configured to:
- receive a control data packet indicating a primary voice node that will be sending a voice data packet in the primary voice window; and
- retransmit the control data packet to at least one node in the network of nodes during the control signal relay window.

19. The computer apparatus of claim 17, wherein the at least one processor is further configured to:
- send a signal to at least one node in the network of nodes that the processor will be a primary voice data source during a subsequent primary voice window during the control signal window; and
- send a voice data packet during the subsequent primary voice window.

20. The computer apparatus of claim 15, wherein the at least one processor is further configured to:
- determine that there is no primary voice data source; and
- reallocate the primary voice window and voice relay window for situation awareness transmission and retransmission.

* * * * *